United States Patent
Meyers et al.

(10) Patent No.: US 8,372,460 B2
(45) Date of Patent: Feb. 12, 2013

(54) SYSTEM AND METHOD FOR NON-THERMAL PLASMA TREATMENT OF FOODSTUFFS

(75) Inventors: Pierre-Emmanuel Meyers, Buc (FR); Jean-Christophe Rostaing, Versailles (FR); Rajat Agrawal, Katy, TX (US)

(73) Assignees: L'Air Liquide Societe Anonyme pour l'Etude et l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 349 days.

(21) Appl. No.: 12/651,409

(22) Filed: Dec. 31, 2009

(65) Prior Publication Data
US 2011/0014330 A1    Jan. 20, 2011

Related U.S. Application Data

(60) Provisional application No. 61/224,755, filed on Jul. 10, 2009.

(51) Int. Cl.
*A23L 3/3409* (2006.01)

(52) U.S. Cl. ........ 426/236; 426/263; 426/313; 426/316; 426/318; 426/319; 426/320

(58) Field of Classification Search .......... 426/263, 426/313, 316, 318, 319, 320, 236
See application file for complete search history.

(56) References Cited

U.S. PATENT DOCUMENTS

| 4,524,080 | A * | 6/1985 | Sugisawa et al. ............ 426/236 |
| 5,115,166 | A * | 5/1992 | Campbell et al. ........ 315/111.21 |
| 2002/0136679 | A1* | 9/2002 | Frieze et al. ................. 422/300 |
| 2003/0026877 | A1 | 2/2003 | Ruan et al. |
| 2003/0091705 | A1* | 5/2003 | Lidster et al. ................ 426/316 |
| 2008/0063577 | A1 | 3/2008 | Crowe et al. |

FOREIGN PATENT DOCUMENTS

| CN | 1306754 | 8/2001 |
| CN | 1316191 | 10/2001 |
| EP | 0 278 623 | 8/1988 |
| EP | 1 884 248 | 2/2008 |

OTHER PUBLICATIONS

Gadri, et al., "Sterilization and Plasma Processing of Room Temperature Surface with one Atmosphere Glow Discharge Plasma," Surface and Coatings Technology 131, (2000), 528-542.
Xu, et al, "Experimental Study and Sterilizing Application of Atmospheric Pressure Plasmas," Thin Solid Films, 506-507, (2006), 400-403.
D'Aquino, Rita, "Preventing Pathogens from Reaching Home Plate," Chemical Engineering Progress, Apr. 8-11, 2006.
U.S. Appl. No. 12/679,231, filed Sep. 16, 2008 (U.S. Equivalent of WO 2009/047441).
International Search Report and Written Opinion for PCT/US2010/041340, mailed Nov. 4, 2010.

\* cited by examiner

*Primary Examiner* — Drew Becker
*Assistant Examiner* — Preston Smith
(74) *Attorney, Agent, or Firm* — Christopher J. Cronin

(57) ABSTRACT

A method for sanitation and preservation of foodstuffs includes the following steps. A container containing a foodstuff is provided. A non-thermal plasma is introduced to an interior of the container. The container is sealed.

21 Claims, 5 Drawing Sheets

SYSTEM AND METHOD FOR NON-THERMAL PLASMA TREATMENT OF FOODSTUFFS

CROSS-REFERENCE TO RELATED APPLICATIONS

None.

BACKGROUND

According to estimates from the U.S. Centers for Disease and Controls (CDC), food born pathogens account for 756 million illnesses, 325,000 hospitalizations, and 5000 deaths each year in the U.S. Moreover, fresh produce is catching up with ground beef as a major source of *E. coli* 0157 H7 and with chicken as a major source of *Salmonella*. Fresh-cut produce is one of the fastest growing sectors of the fresh produce industry. Processing produce into fresh-cut form increases the risk of bacterial contamination and growth because the natural external barrier of the produce is broken by peeling, slicing, coring, trimming, and mashing.

This is also true for Ready-to-Eat (RTE) products for which starting from generally a stabilized raw material, more than 60% of the lifespan of the product can be lost because of these preparation and repackaging steps. For example, a raw block of ham packed under vacuum generally has a lifespan of 90 days whereas sliced ham stored under similar conditions seldom reaches more than 30 days even by following all the hygienic conditions. Hence there is a need for a process which can be applied after the food is processed to reduce or destroy microorganisms just before it is packaged for the preservation of the quality and shelf-life.

The importance of preserving food quality while providing safety is well known and has led to increased interest in nonthermal processing of meat, poultry, and dairy products, produce and beverage. Some of the nonthermal based technologies include high presses processing (HPP), treatment with electric pulse field, irradiation, ultrasonic, etc.

In recent years, nonthermal plasma (also referred to as so-called "cold plasma" or "non-equilibrium plasma") has been investigated to sanitize food products. A plasma is an ionized gas which is formed by the passage of energy, for example by applying a high continuous or alternative voltage to it, or by providing energy in other forms such as microwave, radiation, laser light, or by other means. Compared to gas in its natural state, plasma contains free charged particles, electrons and ions, although it is overall electrically neutral. A nonthermal plasma is in general any plasma which is not in thermodynamic equilibrium, either because the ion temperature is different from the electron temperature, or because the velocity distribution of one of the species does not follow a Maxwell-Boltzmann distribution. As opposed to thermal plasmas where all particles of the medium (neutral molecules, atoms and radicals, ions and electrons have roughly the same energy distribution (meaning a common temperature), in nonthermal plasma electrons have a much higher average energy than heavy species. A limit to such a situation is with the so called cold plasma, corresponding to gas temperature (meaning average energy of the heavy species) is close to ambient. However there may exist plasmas that are nonthermal but not cold, with heavy species temperature less than one order of magnitude below electron temperature. In general such plasmas are sustained by electrical discharges in a gas close to atmospheric pressure and must be distinguished from other mature, industrially applied plasma technologies like welding, cutting and thermal spraying.

For nonthermal plasma, free electrons are excited by the means described above, namely acceleration by the electric field imposed by the external source of excitation. In parallel to this acceleration, electrons undergo random frequent elastic collisions with the molecules and ions, also called heavy particles. Thus electrons continuously gain energy over time in the form of a disordered motion that has similarities with thermal agitation, but is "forced" by electrical energy input and much more intense. The average electron energy corresponds to an equivalent temperature of the order of tens of thousands of degrees. The average energy of electrons is much higher than the heavy particles. If the collisions are not too frequent, in the case of a rarefied gas, for example, they transfer only little energy to the heavy particles and preserve their movement of thermal agitation corresponding to the ambient. If the electrons acquire a very high "temperature" (i.e. average agitation energy) of the order of $10^4$ K they produce inelastic collisions with the heavy particles that produces excitation (in terms of electronic level or vibrational quantified level), ionization (that constantly replenishes the population of electrons and ions to sustain a steady plasma), or dissociation into smaller fragments, atoms and radicals. The excited particles conceal very high "chemical energy" and can be reactive enough to produce surface treatments to a material, without the need to heat the material.

In particular, it is known that cold plasma can destroy, or at least irreversibly inactivate microorganisms.

On the other hand, Modified Atmosphere Packaging (MAP) or controlled atmosphere packaging is a known technique used to extend the shelf-life of fresh or ready-to-eat food products. In this technique, the air surrounding the food in the package is removed partially or entirely and replaced by another gas or gas mixture. The effects of MAP are based on the often observed slowing of plant respiration in low $O_2$ environment. The commonly used gases in MAP are $N_2$, $CO_2$ $O_2$, rare gases (such as Ar), and their mixtures.

There is provided a method for sanitation and preservation of foodstuffs that comprises the following steps. A container containing a foodstuff is provided. A non-thermal plasma is introduced to an interior of the container. The container is sealed.

The method may include one or more of the following aspects:
- the container is sealed while containing the non-thermal plasma or the non-thermal plasma in a de-excited state.
- the non-thermal plasma is generated from a treatment gas selected from the group consisting of $N_2$, $CO_2$ $O_2$, Ar, Xe, Kr, He, Ne, $N_2O$, $H_2$, $H_2O_2$, CO, NO, and mixtures thereof.
- a secondary gas is introduced to the interior of the container without displacing all of the non-thermal plasma or all of the non-thermal plasma in a de-excited state, wherein the container is sealed while containing the secondary gas and non-thermal plasma or de-excited non-thermal plasma.
- the non-thermal plasma is generated from a treatment gas selected from the group consisting of $N_2$, $CO_2$ $O_2$, Ar, Xe, Kr, He, Ne, $N_2O$, $H_2$, $H_2O_2$, CO, NO, and mixtures thereof.
- the secondary gas is selected from the group consisting of $N_2$, $CO_2$ $O_2$, Ar, Xe, Kr, He, Ne, $N_2O$, $H_2$, $H_2O_2$, CO, NO, and mixtures thereof; and the secondary gas is compositionally different from the non-thermal plasma.
- all of the non-thermal plasma or all of the non-thermal plasma in a de-excited state is removed and a shelf-life extending gas is introduced into the interior of the container, wherein the container is sealed while containing the shelf-life extending gas.

the shelf-life extending gas selected from the group consisting of $N_2$, $CO_2$ $O_2$, Ar, Xe, Kr, He, Ne, $N_2O$, $H_2$, and mixtures thereof.

the non-thermal plasma or the de-excited non-thermal plasma is removed by application of vacuum to the container interior.

the non-thermal plasma or the de-excited non-thermal plasma is purged from the container interior by the introduction of the shelf-life extending gas.

the non-thermal plasma or the non-thermal plasma in a de-excited state is removed with application of vacuum to the container interior, wherein the container is sealed under vacuum.

moisture is combined with the non-thermal plasma.

the treatment gas is selected from the group consisting of $H_2$, a mixture of $H_2$ and He, a mixture of $H_2$ and Ar, a mixture of $H_2$ and CO, a mixture of $H_2$ and $H_2O_2$, a mixture of $H_2$ and air, and a mixture of $H_2$ and $N_2O$.

said step of introducing a non-thermal plasma to an interior of the container is performed inside a food packaging machine.

the food packaging machine is a flow pack type food packaging machine.

the food packaging machine is a tray type food packaging machine.

the non-thermal plasma is generated with a non-thermal plasma generation device located outside the food packaging machine and the non-thermal plasma is conveyed from the non-thermal plasma generation device to the interior of the container.

the food packaging machine is a flow pack type food packaging machine, the container is a thin plastic tubular film, and the non-thermal plasma is introduced into the interior of the tubular film with a nozzle.

the food packaging machine is a tray type food packaging machine.

the food packaging machine is a tray type food packaging machine and the non-thermal plasma is generated with a non-thermal plasma generating device comprising at least one planar microwave power applicator disposed in a lid of the tray type food packaging machine.

the food packaging machine is a tray type food packaging machine and the non-thermal plasma is generated with a non-thermal plasma generating device comprising at least one planar microwave power applicator disposed in or on the container.

the the non-thermal plasma generating device comprises at least one planar microwave power applicator said non-thermal plasma is in sustained contact with the foodstuff for a period of time of 0.1 sec to 600 seconds.

said non-thermal plasma is in sustained contact with the foodstuff for a period of time of 5 to 60 seconds.

a vacuum is applied to an interior of the container before said step of introducing the non-thermal plasma.

a biocide is introduced into the container interior before, during or after the introduction of the non-thermal plasma into the container interior.

the biocide is particulate Silver.

DESCRIPTION OF PREFERRED EMBODIMENTS

Combining plasma treatment with MAP or vacuum packaging provides a synergetic effect by first improving the quality of the food product which when stored under modified atmosphere or vacuum further enhances the shelf-life of the product.

Figure 1:
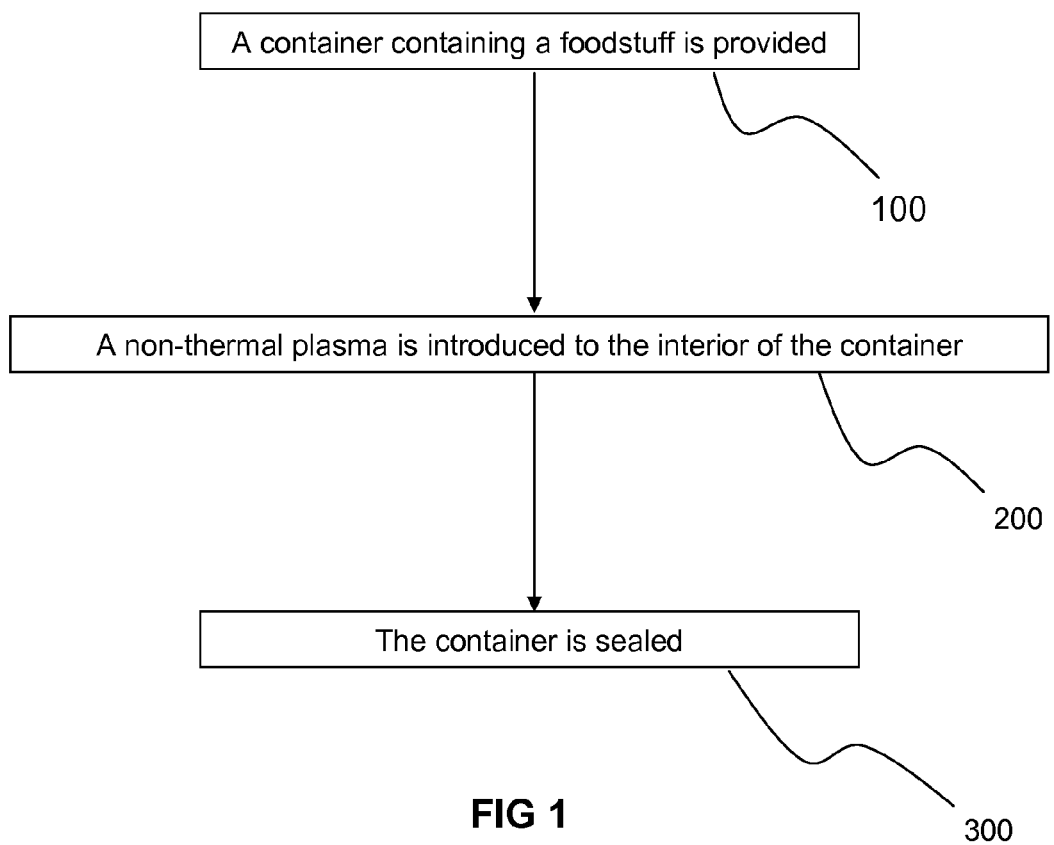
FIG. 1 is a flow diagram of a method according to the invention.

As best illustrated in FIG. 1, an exemplary method of the invention includes the following steps. In a first step 100, a container containing a foodstuff is provided. In a second step 200, a non-thermal plasma is introduced into the container interior. In a third step 300, the container is sealed. While any type of sealed foodstuff container may be utilized in performance of the method, typically it is sealed using a suitable film or a lid. Or, in the case of a flow pack type food packaging machine, opposite edges of a thin plastic film comprising the container are sealed together to form a hollow tube.

It should be noted that the word "container" is intended to mean a food container intended for long-term storage of food and not a plasma treatment chamber. Two non-limiting examples of containers include a tubular plastic film typically used in a flow pack type food packaging machine, and a rigid or semi-rigid plastic tray typically used in a tray type food packaging machine.

While the method and system may be used to treat any foodstuff, typical types of foodstuffs include but are not limited to fresh produce, meat, and seafood.

The non-thermal plasma is generated from a treatment gas which a may be one of several types of gases or gas mixtures. Non-limiting examples include $N_2$, $CO_2$ $O_2$, Ar, Xe, Kr, He, Ne, $N_2O$, $H_2$, $H_2O_2$, CO, NO, and mixtures thereof. In certain embodiments, it may be preferred to utilize a treatment gas of $H_2$, a mixture of $H_2$ and He, a mixture of $H_2$ and Ar, a mixture of $H_2$ and CO, a mixture of $H_2$ and $H_2O_2$, a mixture of $H_2$ and air, or a mixture of $H_2$ and $N_2O$. It is possible to add one or more additives to the treatment gas such as moisture or other compound (for example, Silver or other biocide) to further tailor the efficacy of the plasma. The additive can be in the form of solid, liquid, or gas. Alternatively, the one or more additives may be added to the non-thermal plasma after it has been generated from the treatment gas. As one example of this alternative, the non-thermal plasma may be utilized to convey the one or more additives to the foodstuff surface. A reducing atmosphere (i.e., one having a negative redox potential) may also be employed because it can prevent the degradation of food by oxidation. For example, the treatment gas may include $H_2$ or $H_2$ may be admixed with the non-thermal plasma after it has been generated. In this manner, radicals like atomic hydrogen will be created, which have an extremely strong chemical reducing activity, in fact much higher than any reducing chemical in a commercial form. In addition reducing radicals have germicidal effects comparable to oxidant radicals.

Figure 2:
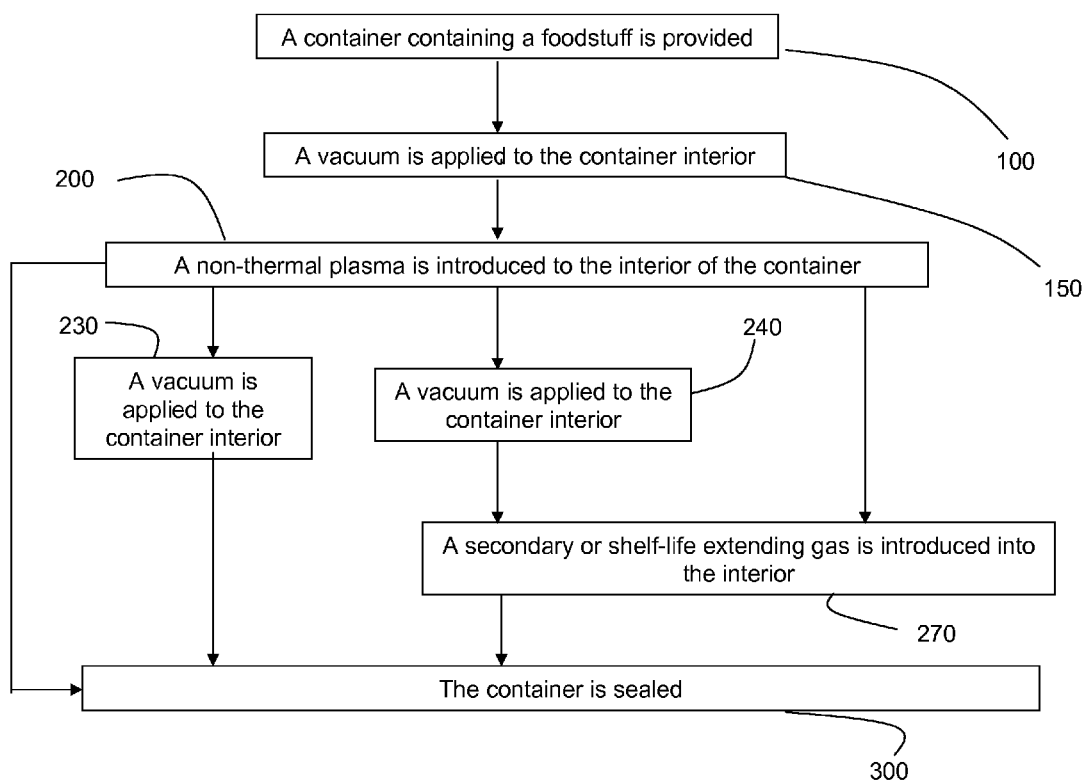
FIG. 2 is a flow diagram of a method according to the invention including additional optional steps.

As best shown in FIG. 2, performance of the method may include additional optional steps.

In between steps 100 and 200, a step 150 of applying a vacuum to the container may be performed. It may be particularly beneficial to apply a vacuum before exposure of the foodstuff to the non-thermal plasma in order to avoid significant proportions of oxidizing gas which can interfere with sustaining the non-thermal plasma.

After performance of step 200, the method can proceed to step 300 in which case the non-thermal plasma or the non-thermal plasma in a de-excited state is sealed inside the container.

Alternatively, after peformance of step 200, a step 230 of applying a vacuum to the interior of the container may be performed followed by step 300. This results in removal of the non-thermal plasma or the non-thermal plasma in a de-excited state and achievement of a vacuum-packaged foodstuff.

In another alternative, after peformance of step 200, a step 270 of introducing a secondary or shelf-life extending gas into the container interior may be performed. The function of the secondary gas is to combine with the gases comprising the non-thermal plasma to produce a gas which promotes the shelf-life of the foodstuff. In this case, the treatment gas (from which the non-thermal plasma is generated) is selected in such a way to provide both antimicrobial and preservation effects, but this of course can result in a compromise between the two effects. So, the secondary gas can be added to the existing gas atmosphere (the non-thermal plasma or the non-thermal plasma in a de-excited state) inside the container to form a gas mixture more optimal for extending the shelf-life of a particular food product. The function of the shelf-life extending gas is to purge the gaseous atmosphere from inside the container (the non-thermal plasma or the non-thermal plasma in a de-excited state) and replace it with a gas which has better shelf-life extending properties when the above-described compromise is not considered sufficiently satisfactory or when certain constituents of the non-thermal plasma react with the foodstuff or container to an extent that it no longer will result in sufficiently satisfactory shelf-life extending properties. The shelf-life extending gas can be same or different gas as the treatment gas. Typical shelf-life extending gases include but are not limited to $N_2$, $CO_2$ $O_2$, Ar, Xe, Kr, He, Ne, $N_2O$, $H_2$, and mixtures thereof.

In yet another alternative, after peformance of step 200, a step 240 of applying a vacuum to the container interior may be performed. It may be particularly beneficial to perform step 240 after exposure of the foodstuff to the non-thermal plasma in order to remove significant portions of oxidizing compounds which for some foodstuffs may have detrimental effects like accelerated oxidation and aging. The method then proceeds to step 270 as described above, but in this case a shelf-life extending gas is used and not a secondary gas. This particular alternative (step 200, step 240, step 270) may be used in lieu of using the shelf-life gas to both purge and replace the non-thermal plasma or the non-thermal plasma in a de-excited state. Hence, less shelf-life extending gas is used.

The non-thermal plasma may be introduced to the interior of the container in a variety of ways. In one embodiment, the non-thermal plasma may be generated remotely from the container. In this embodiment, it may be generated outside of a tray type packaging machine and conveyed to the interior of the tray type packaging machine and the container interior via a conduit. Alternatively in this embodiment, it may be generated outside of a flow pack machine and conveyed to the interior of the tubular plastic film via a nozzle. In another embodiment, the non-thermal plasma may be generated inside (in situ generation) or adjacent to the container. This embodiment may be realized in two sub-embodiments. In the first sub-embodiment, the non-thermal plasma generation device is built into the tray type packaging machine (preferably built into a top lid) and the non-thermal plasma allowed to flow towards and into the interior of the container. In the second sub-embodiment, at least a portion of the generation device is built into the container itself.

Any known non-thermal plasma generating device may be utilized in practice of the method and system. It is preferably a planar microwave power-applicating device comprising two or more electrodes energized by DC or AC power including radiofrequency, of a radiofrequency inductor, or a microwave plasma exciter known to people skilled in the art. Preferably, the non-thermal plasma generation device utilizes a planar microwave applicator of the type disclosed by WO2009047441, the entire contents of which are incorporated herein by reference. This particular type of generation device is particularly advantageous in the embodiments where the generation device (at least portion of) is built into the tray type packaging machine or built into the container. When the non-thermal plasma generation device is located remotely from the container and the generation is not done in situ, there is more freedom in designing the plasma excitation device because, as being located remotely, its designed is not constrained by geometrical factors imposed by the container structure. An exemplary interelectrode distance may be in the range of 1-20 cm, preferably 1-5 or 5-20 cm. One of ordinary skill in the art will recognize that process optimization may be achieved by varying the interelectrode distance in a known manner, or any other design parameter of the plasma excitation device.

While one of ordinary skill in the art will recognize that non-thermal plasma treatment of foodstuffs may be optimized by varying the contact time, an exemplary contact time in practice of the invention is between 0.1 sec to 600 seconds, preferably 5 to 60 seconds. Similarly, while such a one will recognize that process optimization may be achieved by varying the pressure inside the container during exposure of the foodstuff to the non-thermal plasma, an exemplary pressure is in the range of 1,000 Pascal to 11,000 Pascal.

It is further understood by one ordinarily skilled in the art that the following variables may be varied in an empirical manner in order to optimize the treatment for a particular food product: the route of non-thermal plasma application (direct versus remote), non-thermal plasma power or density, distance from the foodstuff surface to be treated, selection of treatment gas used to generate the non-thermal plasma, the pressure of the non-thermal plasma, the average velocity of the plasma gas flowing into or through the container (i.e. residence time of the plasma active species). This latter parameter has possibly to be matched to the lifetime of the different plasma species so that a sufficient amount of them can reach any point of the surface of the foodstuff so as to complete the sanitation treatment effectively. Such lifetime is generally dependant on pressure.

The non-thermal plasma based disinfection exists even if it does not contain any disinfecting chemical (i.e. a product that would have a germicidal effect regardless of the presence of the plasma excitation or not) such as hydrogen peroxide. While not being bound by any one theory, it is believed that the mechanisms of the inactivation of the microorganism by this type of plasma can be explained as follows:

1) Degradation of the genetic material by ultraviolet radiations emitted by the plasma: In plasma, atoms, molecules, ions, radicals carry a high intrinsic energy and are de-energized by emitting UV photons. These photons are similar to the ones emitted by a spectral lamp and have a similar effect. They however have the advantage of not being subjected to the effects of shading and stacking of the germs. Indeed, UV emitted in-situ with the centre even gas surrounds and bathes the germs from all the directions and can cover the surface exposing the microorganisms evenly.

2) Direct antimicrobial action of oxidizing radicals: The latter, in particular atomic oxygen, are oxidants much stronger than any chemical available commercially. They will have a rather similar effect of inactivating microorganisms compared to oxidizing chemical used to destroy microorganisms.

3) Erosion of the matter of the micro-organisms by chemical/physical effects: The oxidizing radicals also have the property to chemically etch the organic matter i.e. they form, with carbon and the hydrogen (from the matter), volatile species like $CO_2$ and $H_2O$ that go to the gas phase and are pulled by the flow of evacuation. In fact, the microorganisms undergo a "cold combustion on the spot". This volatilization of the matter can also be assisted by the ionic bombardment or UV photons. It should also be noted, although it is less known, that reducing radicals can have the same effect of chemical erosion (for example the atomic hydrogen produced in a plasma makes it possible to effectively degrease metal surfaces without oxidizing them). Finally, the erosion can have purely physical origin: the solid organic matter can be dissociated and vaporized in contact with the high energy species.

Exposure of foodstuff to plasma environment allows a notable reduction in the microorganism contaminant without any cooking effect since the gas remains at the ambient temperature. The other physiochemical effects of the cold plasma on the fresh food products need to be investigated, but the plasma treatment leaves little if any, in theory, residue since the radical active species responsible for the useful effects have a very short lifespan.

One can use various devices to apply the excitation to the gas to ionize the gas to form plasma. The choice depends in particular on the geometry of the product, the container and the packaging system, and also of the pressure of work imposed.

Figure 3:
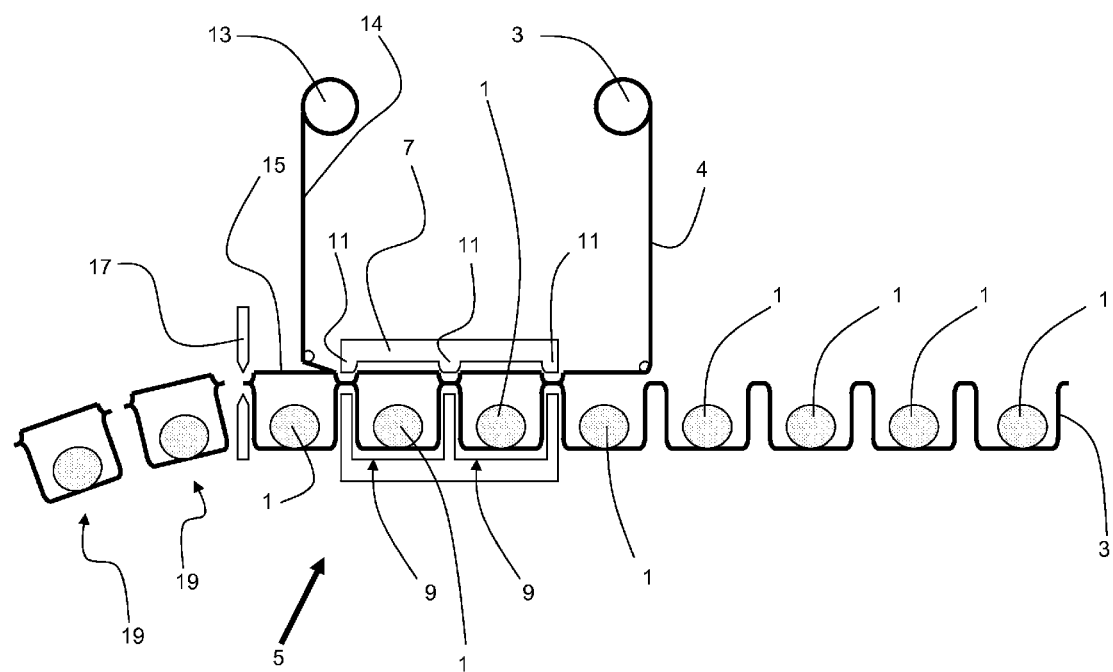
FIG. 3 is a schematic of an application of the invention to a tray-type food packaging device.

As best shown in FIG. 3, the non-thermal plasma may be generated in conjunction with a tray type packaging machine.

In FIG. 3, the foodstuffs 1 are placed into individual compartments of a pre-formed, rigid or semi-rigid, continuous plastic lower film 3. An upper web 4 (comprising a backing 14 and plastic upper film 15) is fed from a roller 3 to the tops of the individual compartments. The combined web 4 and lower film 3 is batchwise fed into the tray type packaging machine 5. The lid 7 is then placed over the combined web 4 and lower film 3. Each compartment rests within a separate portion 9 of the tray type packaging machine 5. If desired, a vacuum may be applied to the interior of the tray type packaging machine 5 to remove the ambient atmosphere (air) from within. The non-thermal plasma is either generated remotely at a non-thermal plasma generation device (not shown) and conveyed to the interior of the tray type packaging machine 5 via a conduit (not shown) or the non-thermal plasma is generated inside the tray type packaging machine 5. The non-thermal plasma is then introduced into the individual compartments of the combined web 4 and lower film 3. If no vacuum was previously applied, the non-thermal plasma flushes out any ambient atmosphere (air) from the compartments.

After the foodstuff 1 is exposed to the non-thermal plasma for the desired period of time, the upper web 4, lower film 3, and foodstuff 1 may be processed in one of three ways. First, the upper web 4 may be sealed to the lower film 3 by heated sealing devices 11 at the expiration of the desired period of exposure time. This option seals the non-thermal plasma or non-thermal plasma in a de-excited state in the containers 19. Second, a vacuum may be applied to the interior of the tray type packaging machine 5 and the upper web 4 sealed to the lower film 3 with devices 11. This results in vacuum-packed containers 19. Third, a vacuum may be applied to the interior of the tray type packaging machine 5, a shelf-life extending gas injected thereinto, and the upper web sealed to the lower film 3 with devices 11. After the processing step, the treated upper web 4, lower film 3, and foodstuffs 1 are removed from the tray type packaging machine 5 and a backing 14 is removed from the upper web 4 and gathered onto a roller 13. After removal of the backing 14, the plastic upper film 15 remains sealed to the plastic lower film. The upper and lower films 15, 3 are then cut into individual containers 19 at the cutting station 17.

Figure 4:
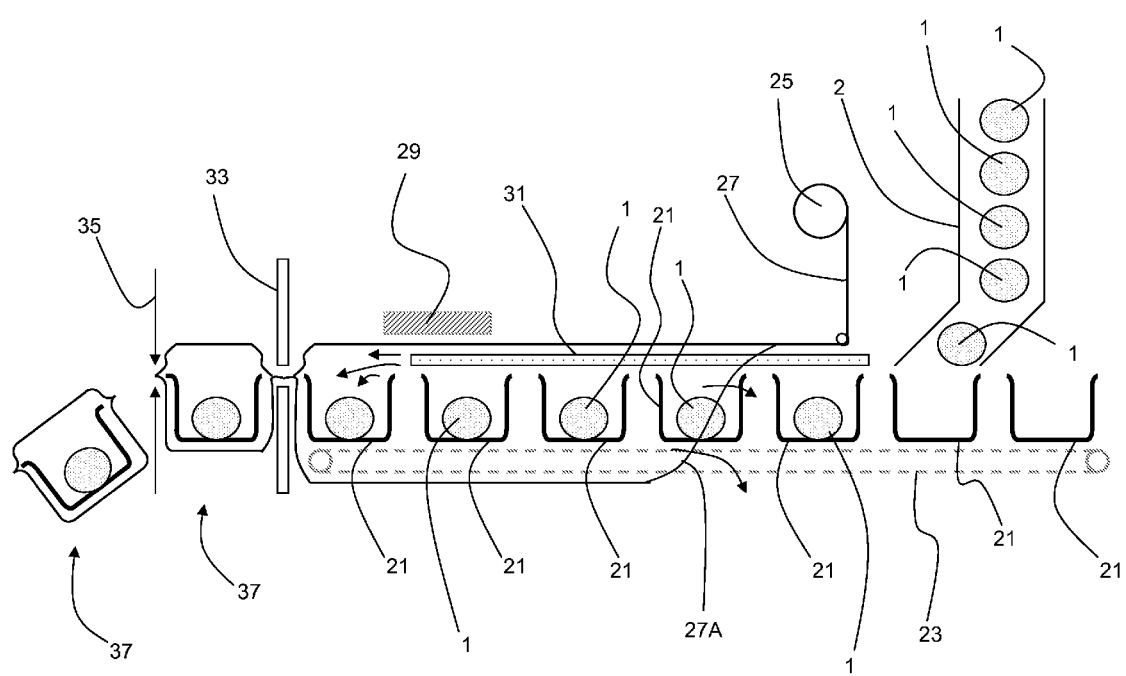
FIG. 4 is a schematic of an application of the invention to a flow pack-type food packaging device.

As best illustrated in FIG. 4, the non-thermal plasma may be introduced to the interior of the container in the context of a flow pack machine. Pre-formed trays 21 are fed by a conveyor 23 towards a foodstuff feeder 2 that feeds foodstuffs 1 into the pre-formed trays 21. A film 27 is fed from a roll 25 towards the conveyor 23 and pre-formed trays 21 and wrapped around itself so that opposite sides 27A of the film 27 are superimposed upon one another to form a tubular plastic film with an unsealed seam along the superimposed sides 27A. The seam is then sealed with a heated sealing device 29. The non-thermal plasma is generated remotely and conveyed (not shown) to a nozzle 31 extending into the interior of the sealed tubular film 27 adjacent the foodstuffs 1 to flush the air from within the interior of the sealed tubular film 27. Upper and lower portions of the film 27 in between adjacent pre-formed trays 21 are then sealed to one another with a heated sealing device 33 to trap the non-thermal plasma within sealed containers 37 each one of which contains a pre-formed tray 21 holding the foodstuff 1. A cutting device then cuts apart adjacent sealed containers 37. One of ordinary skill in the art will recognize that this is a continuous process.

Figure 5:
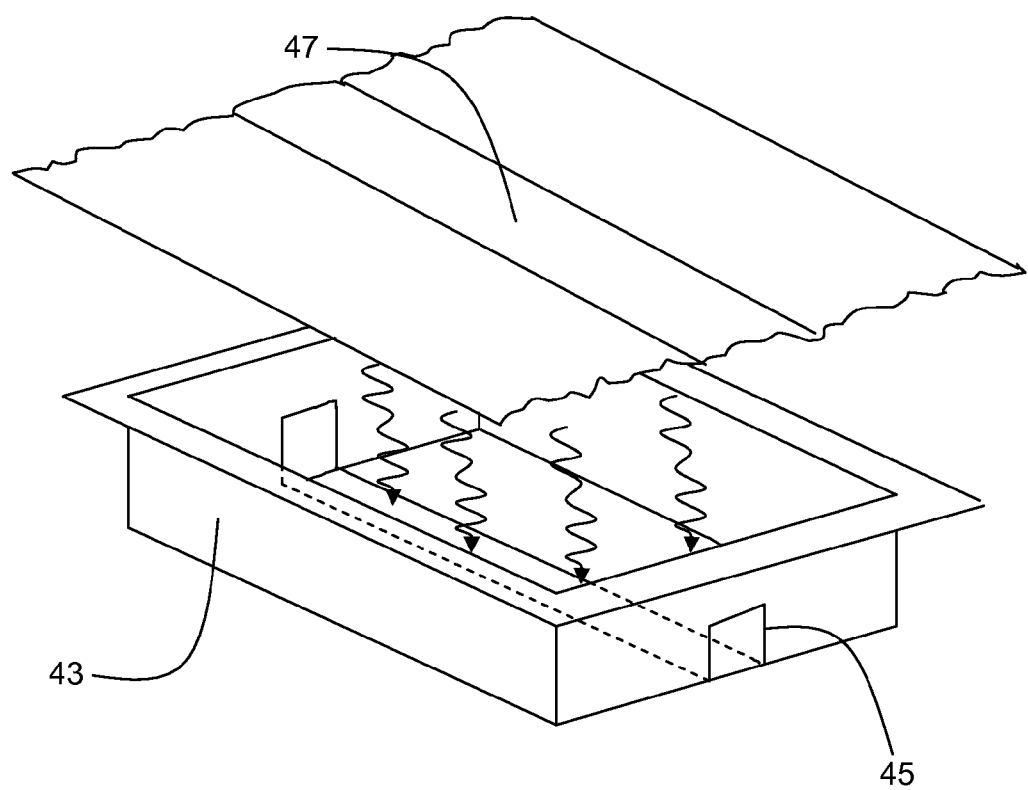
FIG. 5 is a schematic of an application of the invention to a container having a built-in electrode or dielectric discharge barrier.

As best illustrated in FIG. 5, the non-thermal plasma generation device may be built into the lid 7 of the tray type food packing machine 5 of FIG. 3. The generation device includes a dielectric discharge barrier 47 that cooperates with an electrode 45 (formed into or adhered to the inside or outside bottom surface of tray-shaped container 43) disposed underneath barrier 47. Upon energization of the barrier 47 with electrode 45 (and another electrode not shown), the non-thermal plasma flows downwardly and into the interior of the container 43. Alternatively, the electrode 45 is not built into or adhered to the container 43.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for sanitation and preservation of foodstuffs, comprising the steps of:
    placing foodstuffs into individual compartments of a preformed, rigid or semi-rigid, continuous plastic lower film;
    feeding a web to tops of the individual compartments;
    feeding the combined web, compartmented film, and foodstuffs batchwise to a food packaging machine;
    introducing a non-thermal plasma into the individual while the individual compartments are inside the food packaging machine, said step of introducing a non-thermal plasma comprises a step selected from the group consisting of:
  conveying a non-thermal plasma to interiors of the individual compartments inside the food packaging machine, the conveyed non-thermal plasma being generated outside of and remote from the individual compartments, and
  generating a non-thermal plasma from a treatment gas inside the individual compartments inside the food packaging machine, a device generating the non-thermal plasma being built into the food packaging machine or into the combined web and compartmented film;
after exposure of the foodstuffs to the non-thermal plasma for a desired period of time, sealing the web to the compartmented film; and
cutting the sealed web and compartmented film in between the compartments containing foodstuffs thereby providing individual sealed containers of foodstuffs.

2. The method of claim 1, wherein:
the container is sealed while containing the non-thermal plasma; or
the non-thermal plasma is allowed to subside to a de-excited state and the container is sealed while containing the non-thermal plasma in the de-excited state.

3. The method of claim 2, wherein the treatment gas is selected from the group consisting of $N_2$, $CO_2$ $O_2$, Ar, Xe, Kr, He, Ne, $N_2O$, $H_2$, $H_2O_2$, CO, NO, and mixtures thereof.

4. The method of claim 2, further comprising the step of introducing a secondary gas to the interior of the container without displacing all of the non-thermal plasma or all of the non-thermal plasma in a de-excited state, wherein the web and compartmented film are sealed while containing the secondary gas and at least some of the non-thermal plasma or de-excited non-thermal plasma.

5. The method of claim 4, further wherein the treatment gas is selected from the group consisting of $N_2$, $CO_2$ $O_2$, Ar, Xe, Kr, He, Ne, $N_2O$, $H_2$, $H_2O_2$, CO, NO, and mixtures thereof.

6. The method of claim 5, wherein:
the secondary gas is selected from the group consisting of $N_2$, $CO_2$ $O_2$, Ar, Xe, Kr, He, Ne, $N_2O$, $H_2$, $H_2O_2$, CO, NO, and mixtures thereof; and
the secondary gas is compositionally different from the non-thermal plasma.

7. The method of claim 1, further comprising the steps of:
before the web and compartmented film are sealed, removing all of the non-thermal plasma or allowing all of the non-thermal plasma to subside to a de-excited state; and
introducing a shelf-life extending gas into the individual compartments, wherein the web and compartmented film are sealed while containing the shelf-life extending gas.

8. The method of claim 7, wherein the shelf-life extending gas selected from the group consisting of $N_2$, $CO_2$ $O_2$, Ar, Xe, Kr, He, Ne, $N_2O$, $H_2$, and mixtures thereof.

9. The method of claim 8, wherein the non-thermal plasma or the de-excited non-thermal plasma is removed by application of vacuum to the individual compartments.

10. The method of claim 8, wherein the non-thermal plasma or the de-excited non-thermal plasma is purged from the individual compartments by the introduction of the shelf-life extending gas.

11. The method of claim 1, further comprising the step of removing the non-thermal plasma or the non-thermal plasma in a de-excited state with application of vacuum to the container interior, wherein the container is sealed under vacuum.

12. The method of claim 1, further comprising the step of combining moisture with the non-thermal plasma.

13. The method of claim 1, wherein the non-thermal plasma is generated from a treatment gas selected from the group consisting of $H_2$, a mixture of $H_2$ and He, a mixture of $H_2$ and Ar, a mixture of $H_2$ and CO, a mixture of $H_2$ and $H_2O_2$, a mixture of $H_2$ and air, and a mixture of $H_2$ and $N_2O$.

14. The method of claim 1, wherein said step of introducing a non-thermal plasma comprises conveying a non-thermal plasma to interiors of the individual compartments inside the food packaging machine, the conveyed non-thermal plasma being generated outside of and remote from the individual compartments.

15. The method of claim 1, wherein the food packaging machine is a tray type food packaging machine.

16. The method of claim 1, further comprising a step of applying a vacuum to the individual compartments before said step of introducing the non-thermal plasma.

17. The method of claim 1, wherein said step of introducing a non-thermal plasma comprises generating a non-thermal plasma from a treatment gas inside the individual compartments inside the food packaging machine, a device generating the non-thermal plasma being built into the food packaging machine or into the combined web and compartmented film.

18. A method for sanitation and preservation of foodstuffs, comprising the steps of:
  feeding a plurality of pre-formed trays with a conveyor towards a foodstuff feeder;
  feeding foodstuffs into the pre-formed trays with the foodstuff feeder;
  feeding a film towards the pre-formed trays that is wrapped around itself so that opposite sides of the film are superimposed upon one another to form a tubular plastic film with an unsealed seam along the superimposed sides;
  sealing the unsealed seam with a heated sealing device;
  injecting a non-thermal plasma from a nozzle extends into an interior of the sealed tubular film adjacent the foodstuffs thereby flushing air from within the interior of the sealed tubular film;
  sealing upper and lower sides of the sealed tubular film between adjacent pre-formed trays with a heated sealing device to trap the non-thermal plasma within sealed containers each one of which contains a pre-formed tray holding the foodstuff.

19. The method of claim 18, further comprising the step of cutting adjacent sealed containers apart from one another with a cutting device.

20. The method of claim 18, wherein the non-thermal plasma is generated remote from pre-formed trays containing foodstuffs from a treatment gas selected from the group consisting of $N_2$, $CO_2$ $O_2$, Ar, Xe, Kr, He, Ne, $N_2O$, $H_2$, $H_2O_2$, CO, NO, and mixtures thereof.

21. The method of claim 18, wherein the non-thermal plasma is generated remote from pre-formed trays containing foodstuffs from a treatment gas selected from the group consisting of $H_2$, a mixture of $H_2$ and He, a mixture of $H_2$ and Ar, a mixture of $H_2$ and CO, a mixture of $H_2$ and $H_2O_2$, a mixture of $H_2$ and air, and a mixture of $H_2$ and $N_2O$.

* * * * *